United States Patent [19]

Skeie

[11] Patent Number: 5,500,940
[45] Date of Patent: Mar. 19, 1996

[54] METHOD FOR EVALUATING FAILURE IN AN ELECTRONIC DATA STORAGE SYSTEM AND PREEMPTIVE NOTIFICATION THEREOF, AND SYSTEM WITH COMPONENT FAILURE EVALUATION

[75] Inventor: Tom A. Skeie, Boise, Id.

[73] Assignee: Hewlett-Packard Company, Palo Alto, Calif.

[21] Appl. No.: 233,024

[22] Filed: Apr. 25, 1994

[51] Int. Cl.$^6$ .................................................. G06F 11/30
[52] U.S. Cl. ............................ 395/183.01; 395/183.03; 395/183.13; 395/183.18
[58] Field of Search .................... 395/183.01, 183.03, 395/183.13, 183.15, 183.16, 183.18, 183.20, 184.01, 185.01

[56] References Cited

U.S. PATENT DOCUMENTS

| | | | |
|---|---|---|---|
| 4,727,545 | 2/1988 | Glackemeyer et al. | 371/23 |
| 5,101,408 | 3/1992 | Kitsuregawa et al. | 341/16.5 |
| 5,127,005 | 6/1992 | Oda et al. | 371/15.1 |
| 5,210,704 | 5/1993 | Husseiny | 364/551.01 |
| 5,265,035 | 11/1993 | Reifman et al. | 364/551.01 |
| 5,315,972 | 5/1994 | Judy et al. | 123/198 D |
| 5,367,669 | 11/1994 | Holland et al. | 395/575 |

*Primary Examiner*—Hoa T. Nguyen

[57] ABSTRACT

A method for evaluating failure in an electronic data storage system that includes defining a data storage system in terms of its multiple storage components that are operably interconnected to store and retrieve electronic data. Failed storage components are detected and then evaluated to provide a degree of failure for that particular storage component. The data storage system is then analyzed at the system level for any diminished usability in view of the failed storage component and its degree of failure. This diminished usability can be translated into an effect on the data availability within the data storage system. The impact on data availability is reported to the user so that the user can make intelligent decisions which might preempt system-wide failure. A data storage system with failure evaluation is also described.

20 Claims, 5 Drawing Sheets

METHOD FOR EVALUATING FAILURE IN AN ELECTRONIC DATA STORAGE SYSTEM AND PREEMPTIVE NOTIFICATION THEREOF, AND SYSTEM WITH COMPONENT FAILURE EVALUATION

TECHNICAL FIELD

This invention relates to electronic data storage systems, and more particularly, to methods and systems for preempting and evaluating failure in an electronic data storage system.

BACKGROUND OF THE INVENTION

Personal computer systems are constantly improving in terms of speed, reliability, and processing capability. As a result, computers are able to handle more complex and sophisticated applications. As computers improve, performance demands placed on data storage systems increase. In particular, there is an increasing need to design data storage systems which protect data in the event of system degradation or failure.

As an initial step toward the goal of data preservation, advances have been made at the component level. Today, some components in a data storage system have enough intelligence to self-detect failures. For example, disk drives have built-in intelligence which senses and isolates bad sectors of memory, and remaps the data into other operable sectors in an effort to ensure data quality.

Redundancy is one technique that has evolved for preserving data at the component level. The term "RAID" (Redundant Array of Independent Disks) is often used to describe a disk array in which part of the physical storage capacity of the disk array is used to store redundant information about the user data stored on the remainder of the storage capacity. The redundant information enables regeneration of user data in the event that one of the array's member disks or the access path to it fails.

In general, there are two common methods of storing redundant data. According to the first or "mirror" method, data is duplicated and stored in two separate areas of the storage system. For example, in a disk array, the identical data is provided on two separate disks in the disk array. The mirror method has the advantages of high performance and high data availability due to the duplex storing technique.

In the second or "parity" method, a portion of the storage area is used to store redundant data, but the size of the redundant storage area is less than the remaining storage space used to store the original data. For example, in a disk array having five disks, four disks might be used to store data with the fifth disk being dedicated to storing redundant data. The parity method is advantageous because it is less costly than the mirror method, but it also has lower performance and availability characteristics in comparison to the mirror method.

Storage systems are becoming more complex, and typically involve a sophisticated interconnection of many individual components. An example storage system might comprise disk arrays, controllers, software, archival-type storage units, power supplies, interfacing and bussing, fans, a cabinet, etc. As storage systems become more complex, the traditional component level techniques of detecting failure are not well suited when analyzing the storage system as a whole. For instance, examining the disk drive for possible failure is only a single piece of the puzzle concerning operation of the entire storage system and can be misleading if the remaining components of the system are not taken into account.

For example, the RAID algorithms have the ability to reconstruct data upon detection of a disk drive failure. Drive failure is often expressed in terms of performance parameters such as seek-time and G-list. Whenever the drive is not behaving as expected according to its performance parameters, the RAID system may be tempted to reconstruct the disk drive in an effort to cure the irregularity. The disk drive problem, however, may not be due at all to the drive itself, but instead might be caused by some external parameter such as a controller error or a software bug. In this case, looking at a particular disk drive characteristic such as seek-time or G-list is meaningless.

As the number of components within a data storage system grows and the interdependency among the components increases, the problems arising at the component level may detrimentally affect operation of other components and thus, the system as a whole. Additionally, the various component problems affect the system to different degrees. There is therefore a need to design data storage systems that look more globally at the entire data storage system apart from the component level.

Today, there are two software programs available which merely warn the user of a component failure within a data storage system. One software product is sold by Compaq under the trademark INSIGHT MANAGER™, and the other is sold by Hewlett-Packard under the trademark OPEN-VIEW™. However, neither of these software products evaluate the storage system as a whole, nor relate how the failed component impacts the operation of the entire system.

The system user is perhaps most interested in the practical impact that a component failure has on data availability of the data storage system. "Availability" is the ability to recover data stored in the storage system even though some of the data has become inaccessible due to failure or some other reason and the ability to insure continued operation in the event of such failure. "Availability" also concerns how readily data can be accessed as a measure of storage system performance.

Accordingly, there is a need to evaluate the entire system from a global perspective, and translate any component failure into impact on data availability. This information is of value to the user so that the user can intelligently decide whether corrective action is desired and what steps should be taken to cure the failed component.

DISCLOSURE OF THE INVENTION

This invention provides a method for analyzing the entire the storage system and evaluating how partial or full failure of one component adversely affects operation and data availability in the system. The inventive method notifies the user of component failure, the relative importance or criticality of the failure, and what the failure means to system operation and data availability.

According to one aspect, a method for evaluating failure in an electronic data storage system comprises the following steps: (a) providing a data storage system having multiple storage components operably interconnected to store and retrieve electronic data, where a failure of one storage component disrupts operation of the data storage system; (b) detecting a failed storage component; (c) evaluating the failed storage component to derive a degree of failure; (d) assessing importance of the failed storage component to the operation of the data storage system based at least in part on the degree of failure of the failed storage component; and (e) assigning a level of criticality to the failed storage component indicative of the disruption to operation of the data storage system caused by the failed storage component. The level of criticality is selected from a range of levels where higher levels of criticality represent that the failed storage component causes significant disruption to the operation of the data storage system and lower levels of criticality represent that the failed storage component does not cause significant disruption to the operation of the data storage system.

According to another aspect of this invention, a method for preempting failure in an electronic data storage system comprises the following steps: (a) establishing an electronic data storage system having multiple storage components operably interconnected to store and retrieve electronic data; (b) defining failure characteristics of individual storage components in the data storage system; (c) setting failure threshold values for individual storage components, each threshold value indicating a point at which a faulty storage component has experienced one or more events sufficient to degrade component quality that there is a selected statistical probability of failure; (d) defining an impact on other storage components in the data storage system in the event that the threshold value of one storage component is exceeded; and (e) notifying a user when the threshold value of a faulty storage component has been exceeded and alerting the user of the potential impact on the other storage components in the data storage system as a result of the faulty storage component.

This invention also concerns an electronic data storage system having failure evaluation means for evaluating failed storage components and assigning levels of criticality which correlate the degree of component failure with the diminished amount of usability of the entire storage system.

BRIEF DESCRIPTION OF THE DRAWINGS

Preferred embodiments of the invention are described below with reference to the following accompanying drawings depicting examples embodying the best mode for practicing the invention.

FIG. 3 is a graph illustrating the relationships among the degree of component failure, the system usability, and the levels of criticality assigned to the failed component in view of any degradation to system usability.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
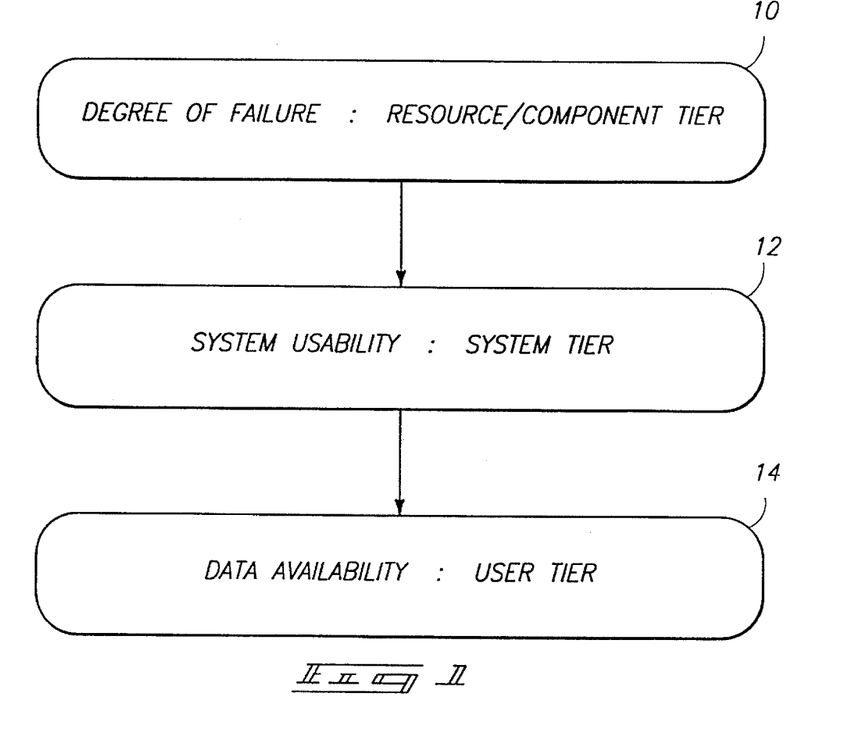
FIG. 1 shows three separate and distinct conceptual levels for analyzing an electronic data storage system which operates according to the methods of this invention.

One aspect of this invention relates to various methods for evaluating failure in an electronic data storage system. This evaluation method can be conceptualized as an analysis of the system on three different tiers. FIG. 1 illustrates the tiers. According to this method of the invention, any failed storage component within the data storage system is initially evaluated to derive a degree of failure of that component. This analysis is made at the resource/component tier 10.

As used in this disclosure, the term "failure" means any degree of failure of a storage component, including slight, partial, substantial, and complete component failure. As an example, slight failure of a disk drive might be described as a bad storage sector on a single disk within the array; whereas complete failure might be described as an inoperable servo motor used to position the read/write heads over the disks. The storage component can, therefore, experience varying degrees of failure depending upon how severe any problem or failure is to the operation of the whole component.

Each component failure, no matter how minor, has some consequence on the operation of the entire data storage system. Accordingly, once a failed storage component has been evaluated to derive a degree of failure, the next step is to assess the importance of that failed storage component to the operation of the data storage system based at least in part on the degree of failure of the failed storage component. Some component failures will cause significant disruption to the operation of the storage system, while other failures will not cause significant disruption to the system operation.

The problem is therefore globally analyzed at the system tier 12 to evaluate impact of the failed component on the usability of the storage system. As used in this disclosure, the term "usability" defines a range of operability between 0% operational and 100% operational, where 100% operational means that every aspect of the entire system is working as expected and designed. Any value of "usability" less than 100% indicates that there is some portion of the system that is not operating as expected or designed. As an example, the loss of a sector on a single disk in an array of multiple disks diminishes system usability by some percentage, albeit an infinitesimal amount.

Once the system is analyzed as a whole based on the impact of a failed component, the event can be described to the user in terms of data availability. This conceptualization occurs at the user tier 14 of FIG. 1. The user is primarily concerned with whether data is readily available, temporarily inaccessible, or permanently lost as a result of the failing component. The user is also interested in the risk of the data becoming inaccessible or permanently lost in the event the component fails to a greater degree, or other affected components within the system begin to fail. To summarize FIG. 1, each failure in a component has an impact on the overall operation of the system which can be related to the user in terms of data availability.

The invention will now be described in more detail with reference to FIGS. 2–6.

Figure 2:
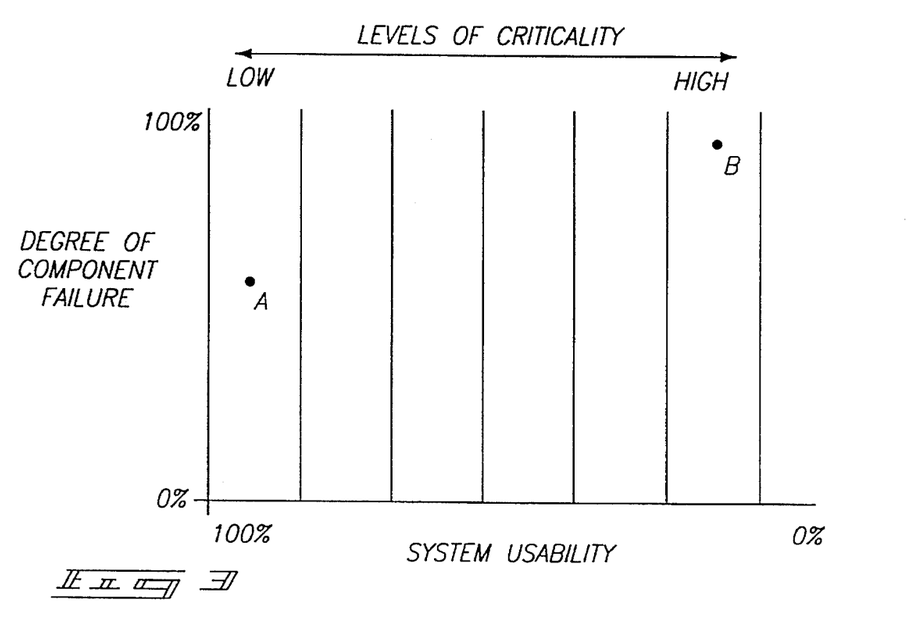
FIG. 2 is a demonstrative illustration of the data storage system. It relates the impact of a failed component in the data storage system on system usability and data availability.

FIG. 2 shows this interrelationship amongst the various tiers in more detail. With reference to the resource/component tier of the diagram and to the flow chart of FIG. 4, a prerequisite step 30 to the failure evaluation method of this invention is to provide a data storage system 20 which has multiple storage components $22_1$, $22_2$, ... $22_N$. The individual storage components are interconnected in a conventional manner to store and retrieve electronic data according to standard techniques that are understood and well-known within the art. As used in this disclosure, the term "component" or "resource" is used interchangeably and means a part, electronic or otherwise, which forms a portion of the data storage system 20.

As an example for purposes of continuing discussion, storage system 20 might include the following storage components, of which some are illustrated in FIG. 2: volatile memory, non-volatile memory (e.g., disk array $22_1$ and CD ROM), a memory controller $22_2$, computer programs $22_3$ (e.g., software and firmware), one or more power supplies $22_4$, a fan $22_5$, a cabinet or housing $22_6$, archival-type memory $22_7$ (e.g., tape-to-tape storage and magneto optical jukebox), and electronic interfacing and bussing $22_9$. The terms "resource" and "component" further contemplate intangible aspects associated with the individual parts such as environmental considerations like temperature.

Over time, various factors begin to degrade individual components. Such component degradation factors are manifest in such detectable aspects as disk seek time, parity errors, remapped sectors, etc. Due to the component degradation factors, individual storage components $22_1-22_N$ become more susceptible to failure. Some factors may cause complete component failure, whereas other factors may cause unnoticeable minor failure. Failure of one storage component diminishes usability of the entire data storage system 20 to a different extent than a failure of another storage component. For instance, failure of disk array $22_1$ would diminish usability to a much greater extent than loss of fan $22_5$.

Figure 4:
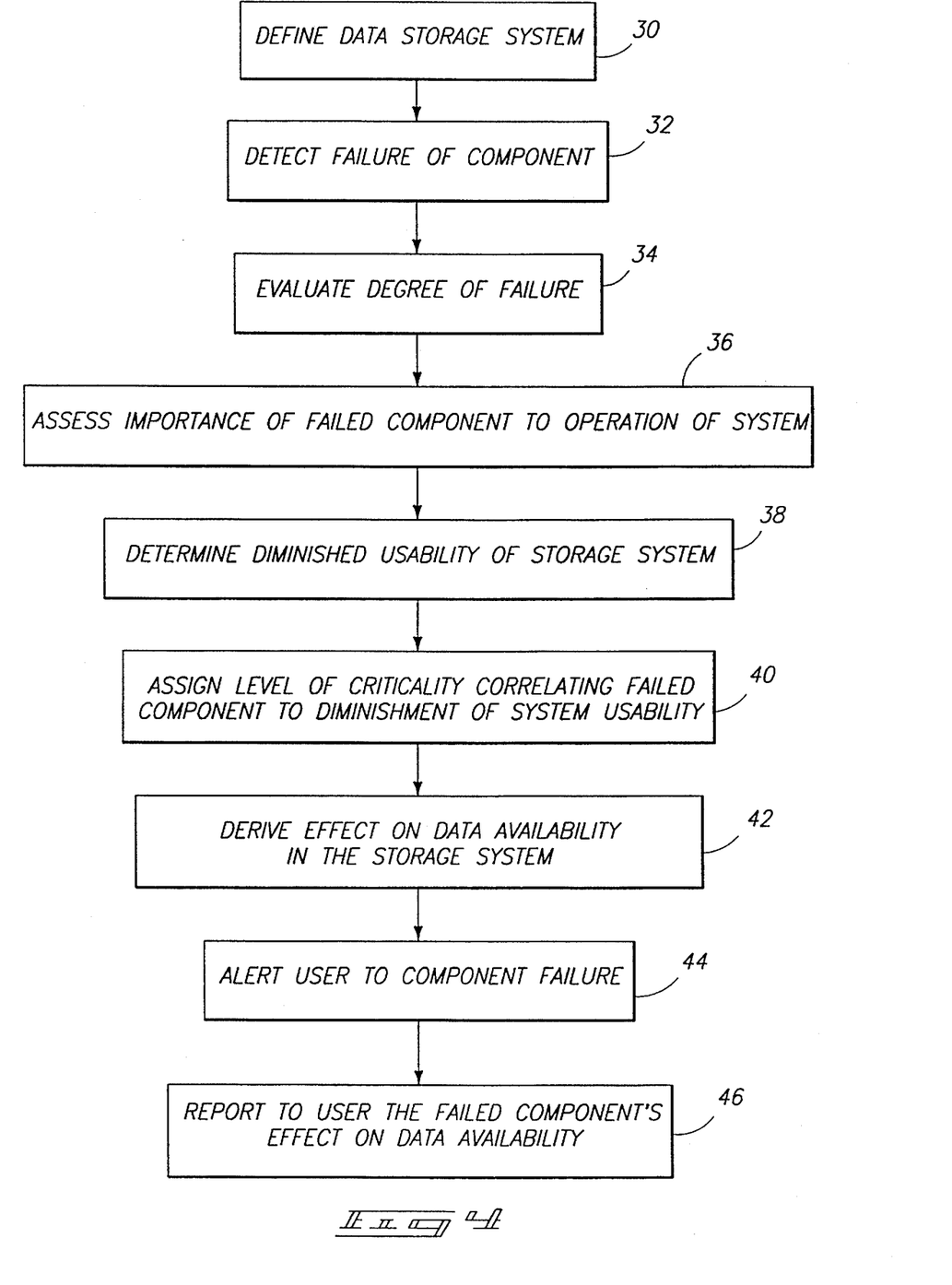
FIG. 4 is a flow diagram showing the steps of a method for evaluating a data storage system according to this invention.

Once the data storage system is defined in terms of its numerous components, the next step 32 of the evaluation method is to detect failure of any one component $22_1-22_N$. Once failure in a component has been detected, the next step 34 is to evaluate the failed storage component to provide a degree of failure for that storage component. As noted above, all components have varying degrees of failure from minor problems which might cause slight unimportant malfunctions to more severe problems which cause substantial or complete inoperability of a component.

At step 36, the importance of the failed component in relation to operation of the entire data storage system is assessed based at least in part on the degree of failure of the failed storage component. One way to quantify this assessed importance is in terms of system usability (step 38). That is, the data storage system experiences greater diminishment of usability if the failed storage component is of higher importance to the failed system. Conversely, there is less diminishment of usability of the data storage system for failed component of less importance to the overall system operation.

One preferred technique for mapping or correlating the importance of failed components to overall system usability is to assign a level of criticality to that failed component (step 40). The "level of criticality" correlates the degree of failure of the failed storage component $22_1-22_N$ to the diminished usability of the entire data storage system 20. The level of criticality is selected from a range of levels where higher levels of criticality represent that the failed storage component significantly diminishes usability of the data storage system and lower levels of criticality represent that the failed storage component does not significantly diminish usability of the data storage system.

FIG. 3 illustrates how the various levels of criticality can be used to correlate the degree of component failure to system usability. In this Figure, the degree of component failure ranges along the Y-axis from 0% (i.e., no failure) to 100% (i.e., complete failure). System usability ranges along the X-axis from complete or 100% usability to 0% usability (i.e., the system is entirely non-usable). The vertical lines segment the X–Y grid into multiple regions or levels of criticality. The levels of criticality range from comparatively lower levels to comparatively higher levels.

As a component fails, the method of this invention assigns a level of criticality which associates the degree of component failure to system usability. For instance, consider point A in FIG. 3. Point A represents a failed component where approximately half of the overall component capacity has been lost. Yet, the component failure, although rather significant on a component level, has very little impact on system usability as the system is still at 90+% usability. Accordingly, the failure of that particular component is assigned a low level of criticality because it does not significantly diminish the usability of the data storage system, even though the component itself has experienced about 50% failure. An example of a failed component at point A would be the periodic loss of a single power supply at certain elevated temperatures that is provided within a data storage system which employs multiple power supplies. The redundant power supplies simply compensate for the malfunctions of the faulty power supply so that system usability remains fairly robust.

In contrast, examine point B in FIG. 3. Here, a component within the data storage system has experienced a very minor degree of failure at the component tier, but yet this failure completely diminishes usability of the entire system. Such a failure would be assigned a very high level of criticality because the failed storage component significantly diminishes usability of the storage system. An example of this situation might be a data generator which is fully operational from an electronics standpoint, but occasionally and unpredictably generates inaccurate data. Although the character generator experiences very little failure in terms of electronics and operation, the erroneous data created by it renders the entire system unusable.

Returning to FIG. 2, the assigned level of criticality effectively maps the causal effect of a failed component at the resource/component tier onto system usability within the system tier. Any failure at the component level results in some loss of system usability. This is graphically illustrated by the pie chart where less than the entire system capacity is usable.

Once information regarding system usability has been generated, it is desirable to relate the degradation and system usability in terms of how that impacts the data. With reference to FIG. 4, the next step 42 is to derive the effect on data availability in the storage system based upon the diminished usability of the system. The user is primarily concerned with the data, as it represents the most valuable asset. Thus, the user is particularly interested in how a component failure affects data availability, or might affect data availability in the future. As shown in FIG. 2, as system usability diminishes from 100% to 0%, data availability likewise drops from 100% to 0%. In practice, data availability typically changes dramatically in large step amounts as certain key storage components are lost as represented by decreasing percentages of system usability.

At step 44, the data storage system alerts the user that a component within the system has experienced some degree of failure. The storage system then reports the effect on data availability in the data storage system as a result of the failed storage component (step 46). This report provides the user with the helpful information to determine how serious the failed storage component is to the operation of the entire system and whether or not it will impact data availability.

The system can also be configured to predict the risk of complete inoperability of the storage component and the likelihood of additional failure of other components within the system. Additionally, the system of this invention can provide the probability of further degradation of data availability and the risk of complete reduction of usability of the data storage system. Such analysis can be accomplished via look-up tables of various risks and probabilities, or through complex equations and functions, or through other means.

Preferably, the system reports these events via a visual display 228, such as a monitor or LED panel, although other informative warning means for reporting to the user can be used. Such alternative informative warning means includes indicator lights or audio devices.

Another method of this invention concerns techniques for preempting failure of an electronic data storage system. The underlying concept of this method is to protect all critical storage system dependent resources by using preemptive notification of predicted failures of independent resources that exhibit measurable, degradable quality and can lead to critical dependent resource failure. As used herein, the terms "independent resource" or "independent component" are used interchangeably to describe a system component that can change quality by itself (e.g., the cache on the controller). The terms "dependent resource" or "dependent component" are used interchangeably to describe those components of the data storage system which only change quality based on a change in an independent variable affecting the system (e.g., a logical drive does not become critical by itself, but only in an event such as disk failure).

Figure 5:
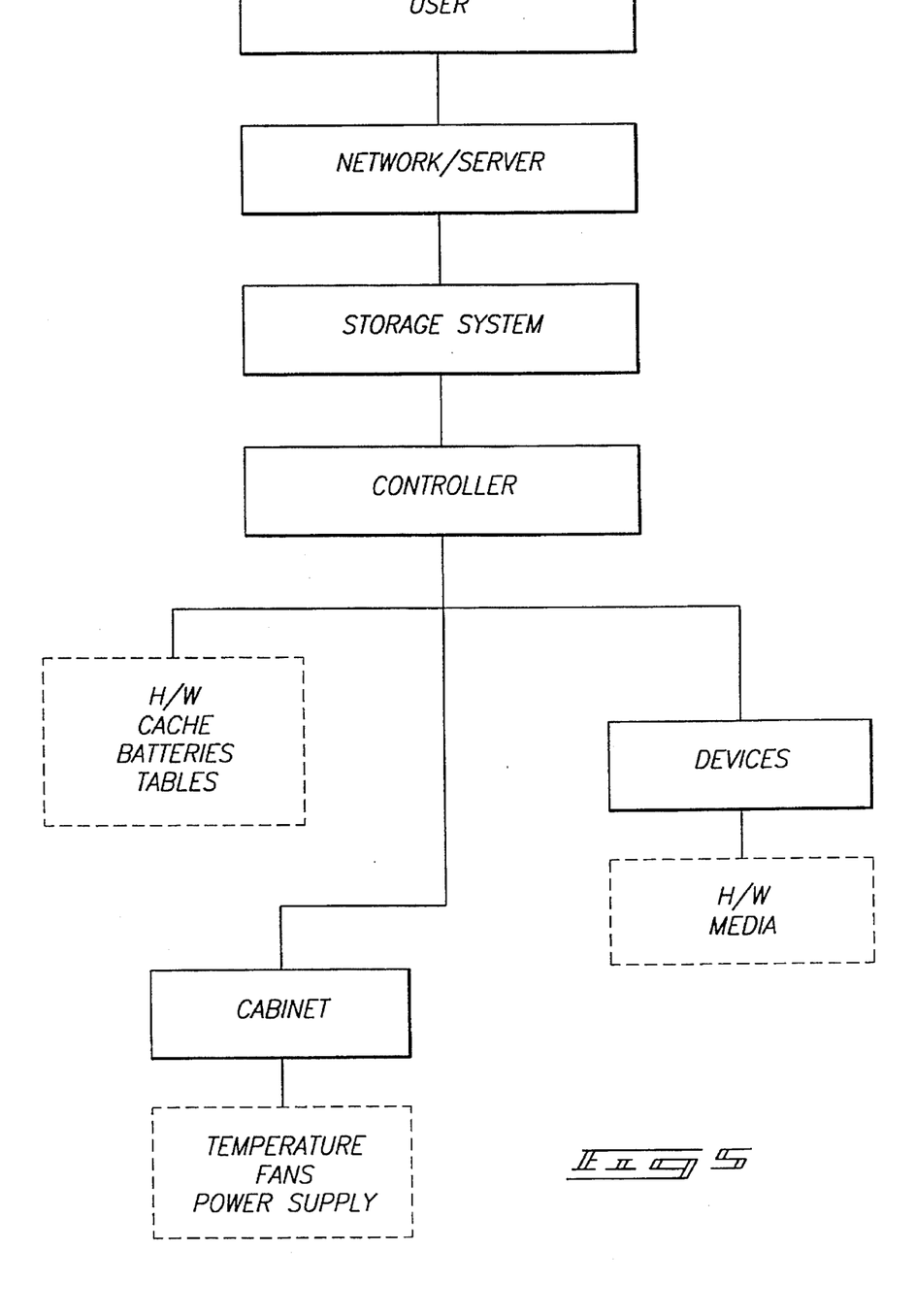
FIG. 5 is an organizational diagram illustrating the interrelationship among the various storage components of the data storage system and the user.

When designing a data storage system according to methods of this invention, the system components are initially classified in terms of being independent resources or dependent resources. FIG. 5 depicts the relationship between independent resources (dotted boxes) and dependent resources (solid boxes). In this example, failure of an independent component can lead to failure of the entire system. Consider, for instance, the loss of a single power supply. It will shut down the disks, which in turn may lead to the user losing access to data and perhaps even data loss. On the other hand, failure of a power supply in a dual power supply cabinet might only affect the ability to withstand future failures, but have no immediate impact on data access.

As described above, within any given data storage system, failure of certain components will be much more critical to the operation of the entire system than failure of others. The preemptive method of this invention prioritizes the dependent resources so that any failure or degradation of quality within that dependent component can be brought quickly to the user's attention in an attempt to preempt any major problem, and thereby protect the most critical components in the data storage system.

Figure 6:
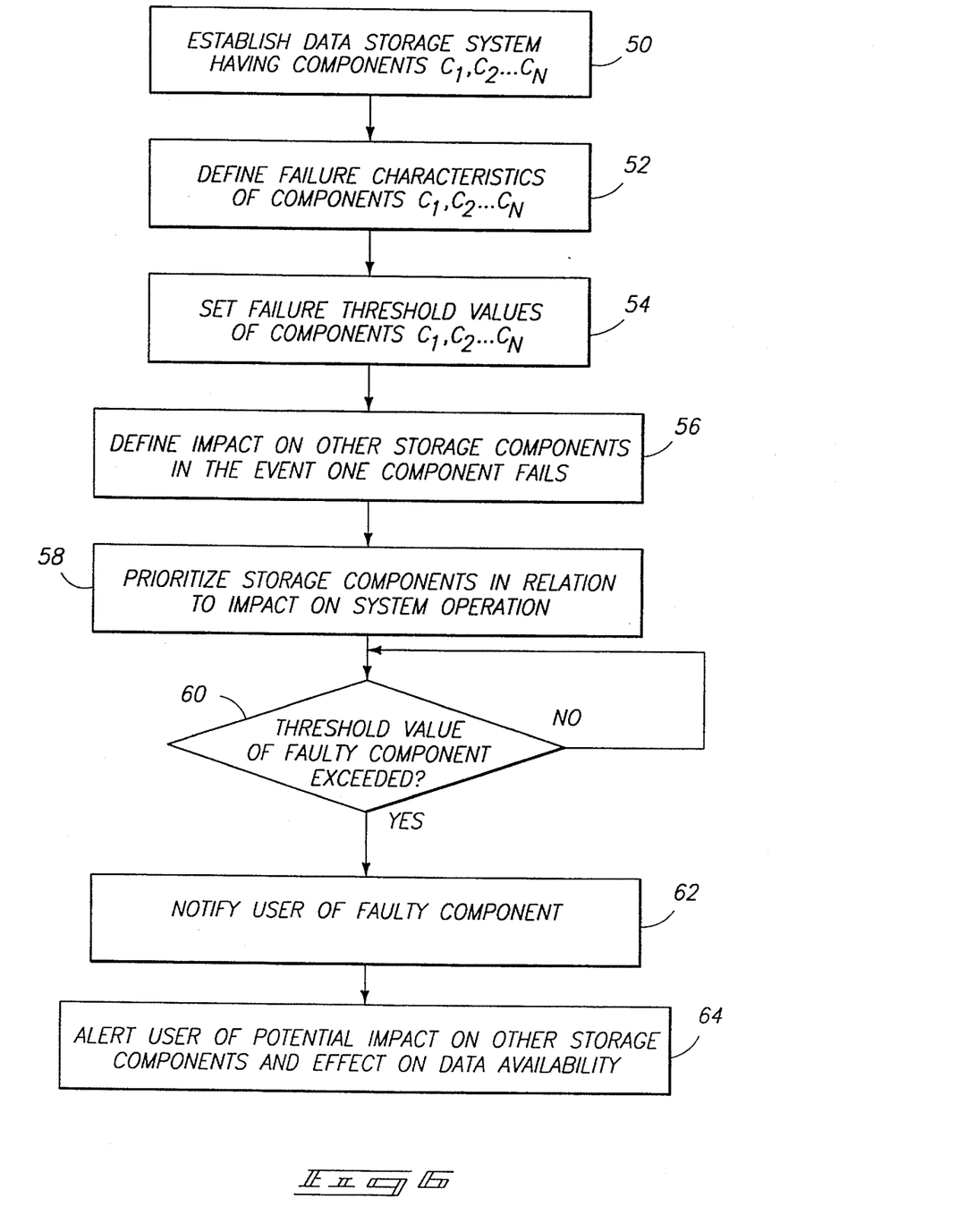
FIG. 6 is a flow diagram illustrating the steps associated with a method for preempting failure of a data storage system.

FIG. 6 shows the steps of the preemptive method according to this invention in more detail. At step 50, the entire data storage system is established in terms of its components $C_1$, $C_2$, ..., $C_N$, and interconnections therebetween. Once all of the components have been identified, the failure characteristics of individual components are defined (step 52). These failure characteristics are determined based on the history of the component, its operation in various environments, and various experimental data collected when testing the component.

At step 54, failure threshold values are set for individual storage components $C_1$–$C_N$. The failure threshold values indicate the point at which a faulty or failing storage component has experienced one or more events sufficient to degrade component quality that there is a statistical probability of failure in the component. Selecting the failure threshold value is important for successful operation of the entire system, if the threshold value is too low, the system will unnecessarily identify too many failures. Conversely, if the selected threshold value is too high, the data system will not adequately identify failures which might be critical to the operation of the system, and therefore be of no value to the user.

At step 56, the impact of one failed component $C_K$ relative to other storage components $C_1$, ... $C_{K-1}$, $C_{K+1}$, , , $C_N$ is defined. For example, if the temperature sensor within the cabinet detects a high temperature, thereby presenting an event where the threshold value of the temperature sensor or cabinet is exceeded, the entire data storage system is analyzed to determine the impact of high temperature on the operation of the other components. The high temperature may cause little or no change in the functionality of other storage components, and thus the impact on the whole system is comparatively low.

To complete the design of the data storage, the storage components are prioritized in relation to the impact that their failure might have on other storage components and on the entire system operation. Higher priority levels are given to those storage components which, in the event of failure, have greater impact on the remaining components and on the operation of the data storage system. Lower priority levels are given to those components that, in the event of component failure, have less impact on the remaining storage components and on the operation of the data storage system.

Once the system is in operation, the various components are constantly monitored to determine whether a failure threshold value of any component is exceeded (step 60). The system will continue to operate normally without any preemptive notification to the user as long as no threshold value is exceeded. Once a faulty component is detected, however, as indicated by its failure threshold value being exceeded, the storage system notifies the user of the faulty component (step 62). The system then alerts the user of the potential impact on the other storage components in the data storage system and the effect on data availability as a result of the faulty storage component (step 64). Preferably, the user is notified via a visual display monitor, or the like, that reports which component failed, how important or critical the component is to the system, whether other storage components are in jeopardy due to this failure, and whether data access is impaired or worse, has been permanently lost.

Since the components are prioritized in terms of their potential impact on the system, it is most preferable to first notify the user of faulty components having higher priority levels before notifying the user of faulty components with lower priority levels. For example, it would be more important to notify the user that the failure threshold value of the controller hardware has been exceeded, because this may cause shut down of the entire storage system, before notifying the user that the failure threshold value of the disk drive G-list has been exceeded, which may only impact the logic drive of the system.

Once the user is adequately notified of the component failure, its impact on system usability, and the resulting effect on data availability, the user can take appropriate precautionary steps to cure the noted problem. Perhaps, a component needs to be reconfigured or replaced, and that such action will return the system to 100% usability. The early-warning preemptive activity therefore helps preserve data by protecting against possible system degradation that might otherwise cause data inaccessibility or data loss.

The above described methods are preferably implemented in software or firmware resident in the data storage system 20. Specially designed circuitry or ASICs (Application Specific Integrated Circuits) can also be constructed to carry out the novel preemptive and failure evaluation methods. These various implementations therefore provide different failure evaluation means for performing such tasks as (1) detecting and evaluating a failed storage component to derive a degree of freedom; (2) assigning a level of criticality which correlates the degree of failure of the failed storage component to the diminished usability of the data storage system; (3) deriving an effect on data availability based upon the diminished system usability; (4) predicting risk of complete inoperability of a failed storage component; and (5) predicting risk of complete inoperability of the entire data storage system.

The preemptive and failure evaluating techniques of this invention are advantageous because they examine the data storage system as whole. As one component completely or partially fails, the storage system determines the possible impact on the operation of the entire storage system as well as any adverse effect on data availability. The user is then notified of the results. In this manner, the user is armed with sufficient information to determine whether to continue operation or to replace certain components within the system to avoid any permanent loss of valuable data.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for evaluating failure in an electronic data storage system, the method comprising the following steps:

providing a data storage system having multiple storage components operably interconnected to store and retrieve electronic data, individual storage components being capable of failure where a failure of one storage component disrupts operation of the data storage system;

detecting a failed storage component;

evaluating the failed storage component to derive a degree of failure;

assessing importance of the failed storage component to the operation of the data storage system based at least in part on the degree of failure of the failed storage component; and assigning a level of criticality to the failed storage component indicative of the disruption to operation of the data storage system caused by the failed storage component, the level of criticality being selected from a range of levels where higher levels of criticality represent that the failed storage component causes significant disruption to the operation of the data storage system and lower levels of criticality represent that the failed storage component does not cause significant disruption to the operation of the data storage system.

2. A method according to claim 1 further comprising predicting risk of complete inoperability of the failed storage component.

3. A method according to claim 1 further comprising predicting risk of complete inoperability of the data storage system.

4. A method according to claim 1 further comprising reporting the level of criticality to a user.

5. A method according to claim 1 further comprising reporting to a user an effect on data availability in the data storage system based upon the level of criticality assigned to the failed storage component.

6. A method according to claim 1 further comprising:

alerting a user that a storage component has failed; and reporting to a user an effect on data availability in the data storage system based upon the level of criticality assigned to the failed storage component.

7. A method for evaluating failure in an electronic data storage system, the method comprising the following steps:

providing a data storage system having multiple storage components operably interconnected to store and retrieve electronic data, individual storage components being capable of failure where a failure of one storage component diminishes usability of the data storage system to a different extent than a failure of another storage component;

detecting a failed storage component;

evaluating the failed storage component to provide a degree of failure of the failed storage component;

determining diminishment of usability of the data storage system due to the failed storage component based upon the degree of failure; and deriving an effect on data availability in the data storage system based upon the diminished usability of the data storage system.

8. A method according to claim 7 further comprising predicting risk of complete reduction of usability of the data storage system.

9. A method according to claim 7 further comprising reporting to a user the effect on data availability in the data storage system resulting from the failed storage component.

10. A method according to claim 7 further comprising:

assigning a level of criticality to the failed storage component which correlates the degree of failure of the failed storage component to the diminished usability of the data storage system, the level of criticality being selected from a range of levels where higher levels of criticality represent that the failed storage component significantly diminishes usability of the data storage system and lower levels of criticality represent that the failed storage component does not significantly diminish usability of the data storage system.

11. A method according to claim 7 further comprising:

assigning a level of criticality to the failed storage component which correlates the degree of failure of the failed storage component to the diminished usability of the data storage system, the level of criticality being selected from a range of levels where higher levels of criticality represent that the failed storage component significantly diminishes usability of the data storage system and lower levels of criticality represent that the failed storage component does not significantly diminish usability of the data storage system; and deriving the effect on data availability in the data storage system based upon the level of criticality assigned to the failed storage component.

12. A method for preempting failure in an electronic data storage system, the method comprising the following steps:

establishing an electronic data storage system having multiple storage components operably interconnected to store and retrieve electronic data;

defining failure characteristics of individual storage components in the data storage system;

setting failure threshold values for individual storage components, each threshold value indicating a point at which a faulty storage component has experienced one or more events sufficient to degrade component quality that there is a selected statistical probability of failure;

defining an impact on other storage components in the data storage system in the event that the threshold value of one storage component is exceeded; and notifying a user when the threshold value of a faulty storage component has been exceeded and alerting the user of the potential impact on the other storage components and effect on data availability in the data storage system as a result of the faulty storage component.

13. A method according to claim 12 further comprising:

prioritizing the storage components into priority levels where higher priority levels indicate that the associated storage component has greater impact on other storage components and on operation of the data storage system and lower priority levels indicate that the associated storage component has less impact on other storage components and on operation of the data storage system;

first notifying the user of faulty storage components having higher priority levels; and subsequently notifying the user of faulty storage components having lower priority levels.

14. An electronic data storage system for storing electronic data, the data storage system comprising:

multiple storage components operably interconnected to store and retrieve electronic data;

individual storage components being capable of failure where a failure of one storage component diminishes usability of the data storage system to a different extent than a failure of another storage component;

failure evaluation means for detecting and evaluating a failed storage component to derive a degree of failure; and the failure evaluation means assigning a level of criticality which correlates the degree of failure of the failed storage component to the diminished usability of the data storage system, the level of criticality being selected from a range of levels where higher levels of criticality represent that the failed storage component significantly diminishes usability of the data storage system and lower levels of criticality represent that the failed storage component does not significantly diminish usability of the data storage system.

15. An electronic data storage system according to claim 14 wherein the failure evaluation means derives an effect on data availability in the data storage system based upon the diminished usability of the data storage system.

16. An electronic data storage system according to claim 14 wherein the failure evaluation means predicts risk of complete inoperability of the failed storage component.

17. An electronic data storage system according to claim 14 wherein the failure evaluation means predicts risk of complete inoperability of the data storage system.

18. An electronic data storage system according to claim 14 wherein the storage components are selected from a group comprising volatile memory, non-volatile memory, archival-type memory, a memory controller, a computer program, a power supply, a temperature controller, electronic interfacing, and a housing.

19. An electronic data storage system according to claim 14 further comprising informative warning means for alerting a user that a storage component has failed and reporting the level of criticality to the failed storage component.

20. An electronic data storage system according to claim 14 further comprising informative warning means for reporting to a user an effect on data availability in the data storage system based upon the level of criticality assigned to the failed storage component.

* * * * *